US010574702B1

(12) United States Patent
Rickerd et al.

(10) Patent No.: US 10,574,702 B1
(45) Date of Patent: Feb. 25, 2020

(54) AUTHORIZATION FOR BUILD CONFIGURATION USING TELEMETRY DATA ASSESSMENT

(71) Applicant: Amazon Technologies, Inc., Seattle, WA (US)

(72) Inventors: Jacob Edward Rickerd, Pickney, MI (US); Amanda Gray, Seattle, WA (US); Tushaar Sethi, Seattle, WA (US); Pujun Wu, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 157 days.

(21) Appl. No.: 15/861,569

(22) Filed: Jan. 3, 2018

(51) Int. Cl.
*H04L 9/00* (2006.01)
*H04L 29/06* (2006.01)
*H04L 9/14* (2006.01)

(52) U.S. Cl.
CPC ............ *H04L 63/20* (2013.01); *H04L 9/14* (2013.01); *H04L 63/0428* (2013.01)

(58) Field of Classification Search
CPC ........ H04L 63/20; H04L 63/0428; H04L 9/14
See application file for complete search history.

(56) References Cited

U.S. PATENT DOCUMENTS

| | | | | |
|---|---|---|---|---|
| 8,009,827 B2* | 8/2011 | Okochi | ............... | G06F 21/72 380/28 |
| 2005/0182966 A1* | 8/2005 | Pham | ............... | G06F 21/51 726/5 |
| 2008/0229414 A1* | 9/2008 | Hudis | ............... | H04L 63/20 726/22 |
| 2016/0182470 A1* | 6/2016 | Rubin | ............... | H04L 63/06 713/168 |
| 2017/0270307 A1* | 9/2017 | Guilley | ............... | H04L 9/002 |
| 2018/0302426 A1* | 10/2018 | Lee | ............... | H04L 63/166 |

OTHER PUBLICATIONS

Dierks, T., et al., "The TLS Protocol Version 1.0," Request for Comments: 2246, Standards Track, Jan. 1999, 75 pages.
Newman, C., "Using TLS with IMAP, POP3 and ACAP," Request for Comments: 2595, Standards Track, Jun. 1999, 16 pages.
Medvinsky, A., et al., "Addition of Kerberos Cipher Suites to Transport Layer Security (TLS)," Request for Comments: 2712, Standards Track, Oct. 1999, 7 pages.
Khare, R., et al., "Upgrading to TLS Within HTTP/1.1," Request for Comments: 2817, Standards Track, May 2000, 13 pages.

(Continued)

*Primary Examiner* — Beemnet W Dada
(74) *Attorney, Agent, or Firm* — Davis Wright Tremaine LLP

(57) ABSTRACT

A system assesses a security configuration proposed for production on a target computer system. The system may receive the security configuration proposed for production and obtain telemetry metrics generated based on security configurations implemented on one or more computer systems of the service provider. The system may assess a security configuration proposed for deployment based on telemetry metrics and generate status information based on the assessment. An authorization recommendation may be provided based whether the status information indicates that the proposed security configuration satisfies one or more conditions.

19 Claims, 8 Drawing Sheets

(56) References Cited

OTHER PUBLICATIONS

Rescorla, E., "HTTP Over TLS," Request for Comments: 2818, Informational, May 2000, 8 pages.

Hoffman, P., "SMTP Service Extension for Secure SMTP over Transport Layer Security," Request for Comments: 3207, Standards Track, Feb. 2002, 9 pages.

Chown, P., "Advanced Encryption Standard (AES) Ciphersuites for Transport Layer Security (TLS)," Request for Comments: 3268, Standards Track, Jun. 2002, 8 pages.

Blake-Wilson, S., et al., "Transport Layer Security (TLS) Extensions," Request for Comments: 3546, Standards Track, Jun. 2003, 28 pages.

Hollenbeck, S., "Transport Layer Security Protocol Compression Methods," Request for Comments: 3749, Standards Track, May 2004, 8 pages.

Friend, R., "Transport Layer Security (TLS) Protocol Compression Using Lempel-Ziv-Stac (LZS)," Request for Comments: 3943, Informational, Nov. 2004, 13 pages.

Moriai, S., et al., "Addition of Camellia Cipher Suites to Transport Layer Security (TLS)," Request for Comments: 4132, Standards Track, Jul. 2005, 8 pages.

Lee, H.J., et al., "Addition of SEED Cipher Suites to Transport Layer Security (TLS)," Request for Comments: 4162, Standards Track, Aug. 2005, 7 pages.

Ford-Hutchinson, P., "Securing FTP with TLS," Request for Comments: 4217, Standards Track, Oct. 2005, 29 pages.

Eronen, P., and H. Tschofenig, "Pre-Shared Key Ciphersuites for Transport Layer Security (TLS)," Request for Comments: 4279, Standards Track, Dec. 2005, 16 pages.

Rescorla, E., and N. Modadugu, "Datagram Transport Layer Security," Request for Comments: 4347, Standards Track, Apr. 2006, 26 pages.

Blake-Wilson, S., et al., "Transport Layer Security (TLS) Extensions," Request for Comments: 4366, Standards Track, Apr. 2006, 29 pages.

Blake-Wilson, S., et al., "Elliptic Curve Cryptography (ECC) Cipher Suites for Transport Layer Security (TLS)," Request for Comments: 4492, Informational, May 2006, 36 pages.

Santesson, S., "TLS Handshake Message for Supplemental Data," Request for Comments: 4680, Standards Track, Sep. 2006, 10 pages.

Santesson, S., et al., "TLS User Mapping Extension," Request for Comments: 4681, Standards Track, Oct. 2006, 11 pages.

Blumenthal, U., and P. Goel, "Pre-Shared Key (PSK) Ciphersuites with NULL Encryption for Transport Layer Security (TLS)," Request for Comments: 4785, Standards Track, Jan. 2007, 6 pages.

Taylor, D., et al., "Using the Secure Remote Password (SRP) Protocol for TLS Authentication," Request for Comments: 5054, Informational, Nov. 2007, 25 pages.

Salowey, J., et al., "Transport Layer Security (TLS) Session Resumption without Server-Side State," Request for Comments: 5077, Standards Track, Jan. 2008, 21 pages.

Mavrogiannopoulos, N., "Using OpenPGP Keys for Transport Layer Security (TLS) Authentication," Request for Comments: 5081, Experimental, Nov. 2007, 9 pages.

Phelan, T., "Datagram Transport Layer Security (DTLS) over the Datagram Congestion Control Protocol (DCCP)," Request for Comments: 5238, Standards Track, May 2008, 11 pages.

Dierks, T., and E. Rescorla, "The Transport Layer Security (TLS) Protocol Version 1.2," Request for Comments: 5246, Standards Track, Aug. 2008, 98 pages.

Salowey, J., et al., "AES Galois Counter Mode (GCM) Cipher Suites for TLS," Request for Comments: 5288, Standards Track, Aug. 2008, 9 pages.

Rescorla, E., "TLS Elliptic Curve Cipher Suites with SHA-256/384 and AES Galois Counter Mode (GCM)," Request for Comments: 5289, Informational, Aug. 2008, 7 pages.

Rescorla, E., et al., "Transport Layer Security (TLS) Renegotiation Indication Extension," Request for Comments: 5746, Standards Track, Feb. 2010, 16 pages.

McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.

Brown, M., and R. Housley, "Transport Layer Security (TLS) Authorization Extensions," Request for Comments: 5878, Experimental, May 2010, 19 pages.

Kato, A., et al., "Camellia Cipher Suites for TLS," Request for Comments: 5932, Standards Track, Jun. 2010, 7 pages.

Tuexen, M., et al., "Datagram Transport Layer Security (DTLS) for Stream Control Transmission Protocol (SCTP)," Request for Comments: 6083, Standards Track, Jan. 2011, 10 pages.

Eastlake, D., "Transport Layer Security (TLS) Extensions: Extension Definitions," Request for Comments: 6066, Standards Track, Jan. 2011, 25 pages.

Mavrogiannopoulos, N., and D. Gillmor, "Using OpenPGP Keys for Transport Layer Security (TLS) Authentication," Request for Comments: 6091, Informational, Feb. 2011, 9 pages.

Turner, S., and T. Polk, "Prohibiting Secure Sockets Layer (SSL) Version 2.0," Request for Comments: 6176, Standards Track, Mar. 2011, 4 pages.

Kim, W., et al., "Addition of the ARIA Cipher Suites to Transport Layer Security (TLS)," Request for Comments: 6209, Informational, Apr. 2011, 10 pages.

Rescorla, E., and N. Modadugu, "Datagram Transport Layer Security Version 1.2," Request for Comments: 6347, Standards Track, Jan. 2012, 33 pages.

Kanno, S., and M. Kanda, "Addition of the Camellia Cipher Suites to Transport Layer Security (TLS)," Request for Comments: 6367, Informational, Sep. 2011, 9 pages.

Salter, M., and R. Housley, "Suite B Profile for Transport Layer Security (TLS)," Request for Comments: 6460, Informational, Jan. 2012, 15 pages.

McGrew, D., and D. Bailey, "AES-CCM Cipher Suites for Transport Layer Security (TLS)," Request for Comments: 6655, Standards Track, Jul. 2012, 8 pages.

Merkle, J., and M. Lochter, "Elliptic Curve Cryptography (ECC) Brainpool Curves for Transport Layer Security (TLS)," Request for Comments: 7027, Informational, Oct. 2013, 11 pages.

Gutmann, P., "Encrypt-then-MAC for Transport Layer Security (TLS) and Datagram Transport Layer Security (DTLS)," Request for Comments: 7366, Standards Track, Sep. 2014, 7 pages.

\* cited by examiner

AUTHORIZATION FOR BUILD CONFIGURATION USING TELEMETRY DATA ASSESSMENT

BACKGROUND

Security measures are highly important features for many modern web-based service providers. Achieving an appropriate balance between operability and security is a challenging and complex problem. In web-based service provider environments, some security measures may help to protect sensitive user data. However, implementing some security measures may adversely affect the ability of some users to connect to a service or may cause some computer system entities of the service provider to experience system slowdowns or outages. It is difficult to predict how implementing a security measure may affect user experience or computer system performance while providing adequate protection.

BRIEF DESCRIPTION OF THE DRAWINGS

Various techniques will be described with reference to the drawings, in which.

DETAILED DESCRIPTION

Figure 1:
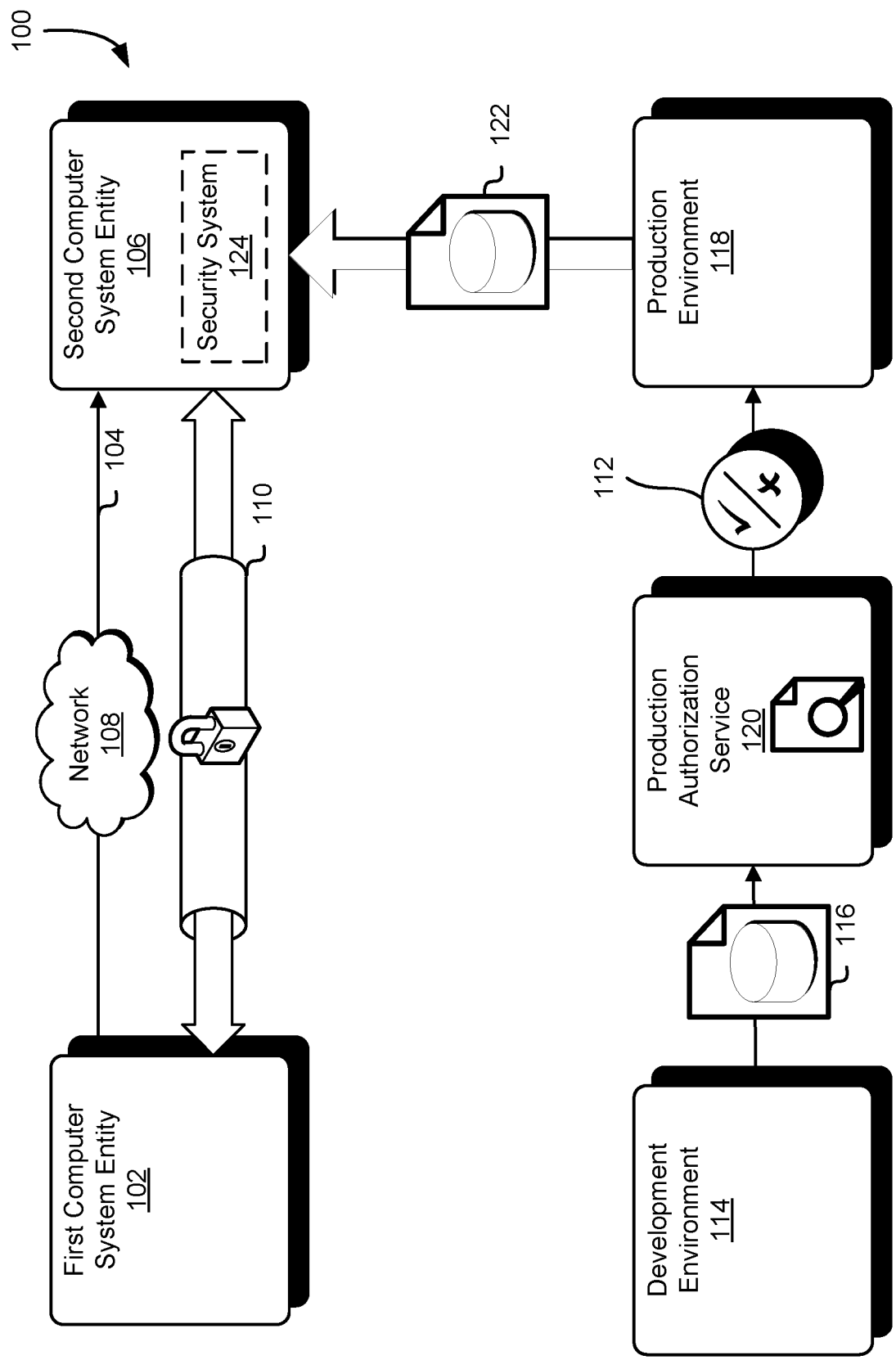
FIG. 1 illustrates an environment in which various embodiments may be implemented.

Techniques described and suggested herein include methods, systems and processes for assessing and authorizing deployment of a computer system configuration. In a multi-stage architecture for deploying modifying or creating computer system configurations, a computer system configuration including one or more security measures (e.g., cryptographic protocols, cipher suites) is created in a development environment and presented to a production authorization service. The production authorization service assesses the computer system configuration generated based on telemetry metrics associated with implementing other computer system configurations that include security measures. Characteristics of the proposed computer system configuration are evaluated according to the assessment of the assessment and the production authorization service provides an authorization recommendation based on the status information. In response to an authorization recommendation regarding whether to initiate production of the computer system configuration on a target computer system, a production environment may finalize and deploy the computer system configuration to one or more computer system entities. The target computer system is a computer system on which the computer system configuration is proposed to be implemented.

Telemetry data may be used to evaluate aspects of a security configuration implemented on computer system entities of a computing resource service provider. The computer system resource provider may comprise virtual and physical computer system entities, hardware, software, networks, storage, cooling, data storage, and the like, configured to provide web-based services to customers. Computer system configurations for computer system entities may include security configurations for protecting data. Telemetry data may be collected from the computer system entities regarding network traffic and resource utilization in connection with various security measures. The telemetry data is aggregated and processed to determine telemetry metrics regarding operability and security for the various security measures and/or the computer system entities implementing the security measures.

A set of assessments may be generated based on correlations between telemetry metrics and security measures. The set of assessments may relate to assessing the operability or security of a proposed configuration in view of previously implemented computer system configurations. The set of assessments may test for the inclusion or exclusion of configuration aspects in a proposed configuration that were determined as being advantageous or detrimental in connection with previous computer system configurations. The set of assessments may include evaluating the proposed configuration in view of the hardware and/or software configuration of the target computer system. As a result of applying the set of assessments to the proposed configuration, status information may be generated indicating the security and/or operability of the proposed configuration. Security and operability of configuration aspects may be evaluated based on telemetry metrics associated with previously or currently implemented security measures and computer system configurations, from one or both of a customer or service provider perspective. In one illustrative example, a security measure implemented in connection with a certain computer system configuration may cause an unacceptable amount of computing resources to be consumed or may cause system slowdowns or outages. In another illustrative example, implementing a security measure may increase security but prevent numerous customers from accessing service provider resources. In a further example, implementing the security measure may not comply with one or more security standards.

The authorization service may generate status information regarding operability and security of the proposed configuration based on the result of applying the set of assessments to the proposed configuration. The status information may indicate whether the proposed configuration satisfies criteria related to the operability and/or security associated with implementing the proposed configuration on the target computer system. The authorization service may provide an authorization recommendation to the production environment regarding whether the proposed configuration should be authorized for production on the target computer system. In response to determining that the status information indicates that the implementation of the proposed configuration may not satisfy criteria related to security and/or operability, the authorization service may provide guidance regarding aspects of the proposed configuration that failed to satisfy the security and/or operability criteria.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an environment 100 for analyzing a proposed computer system configuration according to one or more embodiments. A first computer system entity 102 may send a request 104 to a second computer system entity 106 over a network 108. The first computer system entity 102 may be one or more client computer systems of a customer, or one or more computers systems of a computing resource service provider, such as a host, service, or endpoint. The second computer system entity 106 may include a security configuration for implementing one or more security measures to protect data. The second computer system entity 106 may implement a security measure in connection with receiving the request 104. The request 104, for example, may include a request to establish a cryptographically secure communications session 110, or a request to perform an operation, for which it may be appropriate to establish the secure communications session 110 before the request to perform the operation may be fulfilled. The second computer system entity 106 may be a computer system entity of a computing resource service provider that provides web-based services for its users.

The computing resource service provider may comprise a production pipeline for producing new computer system configurations for its computer system entities. A production pipeline refers to a process and systems for implementing changes to application code, software configurations, hardware configurations, security configurations, and computing resources. The production pipeline has multiple sequential stages such that changes to application code, software configurations, hardware configurations, security configurations, computing resources, etc. are compiled and built in one or more staging environments. A staging environment may comprise a computer system including hardware and executable code that causes the computer system to perform operations described herein. The production pipeline may comprise a development environment 114 and a production environment 118. New security measures or modifications to current security measures may be implemented by deploying a computer system configuration on one or more computer system entities.

The development environment 114 corresponds to the development stage of the production pipeline described above. A user, such as a developer or programmer, may generate a security configuration 116 for deploying one or more security measures proposed in connection with operations performed on or by the second computer system entity 106. The security configuration 116 may be a part of a computer system configuration to be implemented on a computer system of the service provider. The second computer system entity 106 may comprise one or more host computing devices, such as a physical or virtual host. The host computing devices may include hardware and/or software configured to perform one or more services of the computing resource service provider. The computing devices may correspond to server computing device having one or more processors, memory, operating system and software applications that can be configured for a variety of purposes. Additionally, the host computing devices may be configured to host one or more virtual machine instances. The host computing devices may be organized according to a physical placement of a set of host computing devices, such as a rack or other support structure. The host computing devices may correspond to termination points of communication, such as a proxy, between two computing entities—for example, wherein a client connects to a load balancer through a protocol, such as transport layer security (TLS).

The security configuration 116 may comprise a set of instructions, such as code, that is executable by one or more processors of the target computer system to implement one or more security measures for protecting data associated with a communication. The instructions are written and compiled by developers or programmers using resources in the development environment 114. The security configuration 116 is provided to a production authorization service 120, which analyzes the security configuration 116 based at least in part on data obtained regarding one or more computer system entities, as described below. A security configuration, as referred to herein, is information that is useable to configure one or more aspects of a security measure for protecting information of a computer system. The security configuration may include a set of parameters related to the security measures, as described below. The security configuration may be useable to update or establish the configuration of an existing security system that implements one or more security measures, such as a system for establishing cryptographically secure communications sessions, as described herein. In one embodiment, the security configuration may be a configuration file that is useable to configure various parameters and settings of a security system. In one embodiment, the security configuration may include executable instructions, such as a script or executable file, which, as a result of being executed, configures software comprising the security system. The security configuration may, at least in part, define a configuration of the security system, such as packages and modules, and may specify whether the security system will support various protocols, cipher suites, algorithms, or other security-related features.

The production authorization service 120 may provide information 112 regarding the new security measure to the production environment 118. The information 112 may include a recommendation regarding whether the security configuration 116 should be implemented on the second computer system entity 106. The recommendation, for instance, may include an indication authorizing implementation of the security configuration 116, or an indication rejecting implementation of the security configuration 116. The information 112 may include guidance regarding one or more modifications that should be implemented in the security configuration 116 to improve one or more aspects thereof, such as a security aspect or an operability aspect, as described below. Based on the information 112 provided from the production authorization service 120, a decision may be made at the production environment 118 to implement the security configuration 116 on the second computer system entity 106. Alternatively, the production authorization service 120 itself may provide the decision on whether to implement the security configuration 116 on the second computer system entity 106.

Implementing the security configuration 116 may include initiating installation of the security configuration 116 on the second computer system entity 106, including the security configuration 116 in an update to be pushed to the second computer system entity 106, or by otherwise making the security configuration 116 available to the second computer system entity 106. A production version 122 of the security configuration 116 may be provided to the second computer system entity 106 in association with an authorization recommendation of the information 112 to implement the security configuration 116. The production version 122 may modify, establish, or otherwise affect the configuration of a security system 124 that implements one or more security measures, such as establishing the secure communications session 110. The production version 122 may be part of a continuous integration in which modifications are incrementally pushed to the second computer system entity 106. A build process may be performed in association with a decision to authorize implementation of the security configuration 116, for example by compiling source code and associated resources (e.g., libraries) to generate the production version 122.

Figure 2:
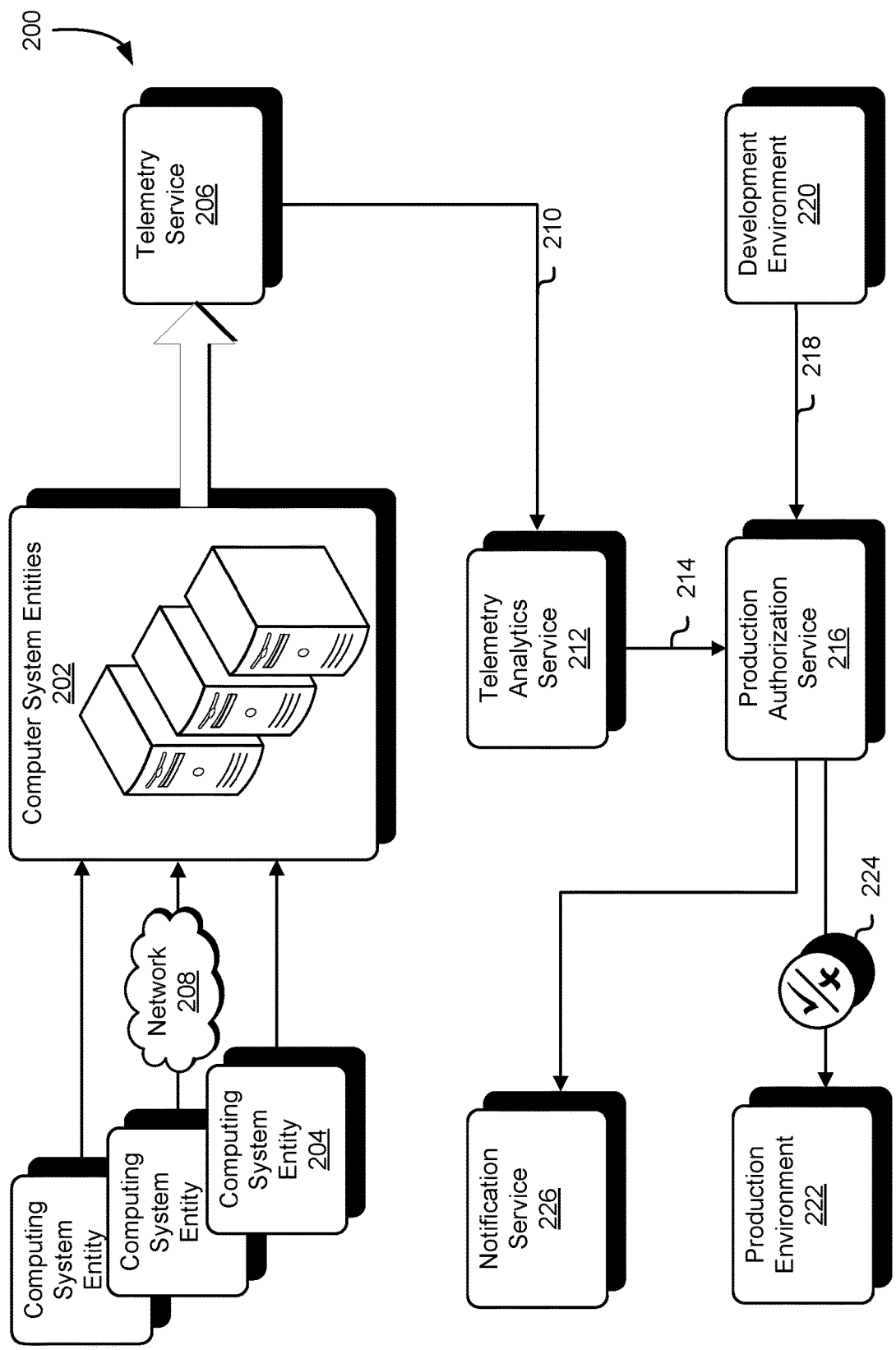
FIG. 2 illustrates an environment for authorizing production of a security configuration to a computer system entity.

FIG. 2 shows an environment 200 for assessing implementation of a new security configuration based at least in part on an analysis of telemetry data according to one or more embodiments. One or more computer system entities 204 may communicate with a set of computer system entities 202 over a network 208 for fulfilling one or more may correspond to resources of the computing resource service provider, such as services or applications that the computing resource service provider provides to customers or implements in connection with fulfillment of those services or applications. In some embodiments, the computing resource service provider provide an environment within which one or more applications, processes, services, virtual machines, and/or other such computer system entities may be executed to provide one or more computing resources to customers. Examples of services include cryptographic services, data storage services, web-hosting services, provisioning of computing capacity (e.g., virtual machines), and data processing services, by way of non-limiting example. The services or applications may include hardware (e.g., servers, processors, personal computers, memory) configured with executable code that cause the hardware to perform one or more operations in connection with requests. In one embodiment, the computer system entities 204 correspond to customers that are accessing, or attempting to access, services of the service provider. The customers may reside on an untrusted network separate from a local network of the service provider, such as the internet. In one embodiment, the computer system entities 204 correspond to services or applications of the service provider that are accessing, or attempting to access, other services and/or applications of the service provider.

A telemetry service 206 collects telemetry related to security measures used in connection with communications, over a network 208, between computer system entities 202 of a computing resource service provider and computer system entities 204. The telemetry service 206 is a service of the service provider that obtains telemetry regarding communications between the computer system entities 202 and computer system entities 204. The telemetry service 206 is a computer system that can be implemented using hardware and software, and may comprise one or more processors and memory that stores executable instructions whose execution by the one or more processors causes the telemetry service 206 to perform operations described herein. The telemetry service 206 may aggregate telemetry obtained over a period of time regarding the communications. The telemetry obtained may indicate an amount of communications received over a period of time, information indicating a source and/or destination of the communications, protection information indicating security measures associated with the communications, and so forth. The protection information may include information regarding establishment of cryptographically secure communications channels, as described in greater detail with respect to FIG. 3. The telemetry service 206 may aggregate and organize the telemetry to determine telemetry metrics 210, as described below. The telemetry service 206 may provide the telemetry metrics 210 to a telemetry analytics service 212.

The telemetry analytics service 212 analyzes the telemetry metrics 210 and, based on the analysis, generates a set of assessments for generating guidance regarding a security configuration. The telemetry analytics service 212 may be a computer system comprised of software and hardware including one or more processors and memory that stores executable instructions whose execution by the one or more processors causes the telemetry analytics service 212 to perform operations described herein. The telemetry analytics service 212 may analyze the telemetry metrics 210 to determine status information associated with telemetry characteristics for the service provider. Status information may include information that indicates a security status produced in association with a security configuration and/or an operability status associated with aspects of the security configuration. The security status may indicate a level of compliance with one or more standards, such as government standards (e.g., National Institute for Standards and Technology Standards, U.S. Government Federal Information Processing Standards) or internal standards maintained privately by a corporate entity. The level of security may, for example, indicate that a security configuration has a high-level or low-level of compliance with a standard, such as represented by a grade, rank, or score, or may indicate that the security configuration passes or fails one or more standards.

The operability status may indicate a level of usability, interoperability, or efficiency associated with implementing a security configuration in association with a hardware configuration and/or a software configuration of a computer system. Usability refers to the property of a security configuration to be successfully implemented by a computer system having a particular hardware/software configuration. The operability status may, for instance, indicate that a computer system having a certain configuration of hardware and/or software was able to successfully implement a security measure according to a security configuration without causing the system to crash. Interoperability refers the property of a number of customer computer systems to successfully communicate with a computer system deploying a security measure. Operability status in the context of interoperability may, for instance indicate that a population of customers may communicate with the computer system implementing the security configuration. Efficiency refers to the property of a computer system to operate in a specified range (e.g., consume an amount of computing resources within a specified range) in association with deployment of a security measure. The operability status may also be based on whether the computer system was able to achieve certain metrics while attempting to implement the security measure, such as by implementing the security measure within a certain period of time. As another example, the operability status may be based on whether the computer system maintained system resource utilization within a certain range while implementing the security measure, such as by using less than a certain percentage or amount of compute capacity or memory while implementing the security measure. As a further example, the operability status may be based on whether one or more users or other service endpoints are prevented, obstructed, or impeded from using or accessing a system resource as a result of implementing the security measure. In general, the operability status may be an indication that implementing a security measure may cause the computing resources of a service provider computer system to be overwhelmed, or unintentionally impede customers from accessing service provider resources.

Based on the status information generated, the telemetry analytics service 212 may generate a set of assessments that may be used to provide guidance regarding implementing a security measure. The set of assessments may include logical expressions or conditions that, as a result of being applied to a system configuration, produce data regarding the system configuration, such as data indicating whether system configuration includes one or more features. The set of assessments may comprise executable instructions, such as a script (e.g., JavaScript) or program, stored in memory that receives a system configuration as an input. The set of assessments may indicate one or more aspects of a security measure to be considered in providing guidance regarding implementing the security measure.

Each set of assessments may be related to a specific security domain. For example, one set of assessments may be directed to providing guidance on a configuration for establishing a cryptographically secure communication channel. Another set of assessments may be directed to providing guidance on a configuration for cryptographically authenticating a user or data object. As a further example, a set of assessments may be directed to encryption and/or decryption of data. In general, the security measures discussed herein may involve cryptographic protocols that involve the exchange and/or processing of cryptographic information in association with the performance of a cryptographic algorithm. Although the set of assessments discussed herein relates to a set of assessments that provide guidance on a configuration for establishing a cryptographically secure communication channel, those of ordinary skill in the art will appreciate that the systems and methods described herein may be extended to apply to various security solutions.

A set of assessments 214 generated by the telemetry analytics service 212 may be provided to a production authorization service 216. The set of assessments 214 may be provided, for example, by transmitting the set of assessments 214 over a network to the production authorization service 216 (also referred to as authorization service), or by making the set of assessments 214 available to the authorization service in data storage. The production authorization service 216 may use the set of assessments 214 to provide information regarding implementation of a proposed security configuration 218 received from a development environment 220 of the computing resource service provider. The proposed security configuration 218 may be a new configuration of a currently used security configuration for deploying one or more security measures, or a new type of security configuration that has not yet been implemented by the computer system of the computing resource service provider, or a particular computer system, service, or application thereof. For example, the security configuration 218 may correspond to a configuration of a security system configured to deploy a cryptographic protocol related to establishing a cryptographically secure communications session. Although the production authorization service 216 is depicted as being a separate entity than the telemetry analytics service 212, this is not necessarily the case. In one embodiment, the telemetry analytics service 212 and the production authorization service 216 may be part of the same service that performs the operations described herein.

The development environment 220 is an environment useable to develop security configurations of security systems and/or security measurements for protecting information associated with the computing resource service provider. The development environment 220 may be a computer system comprised of software and hardware (e.g., servers, personal computers) including one or more processors and memory that stores executable instructions whose execution by the one or more processors causes the development environment 220 to perform the operations described herein. Using the development environment 220, one or more authorized entities, such as developers, programmers, or system administrators, may generate a package that includes a collection of data objects that a computer system of the service provider may process to install a new security measure or modify a configuration for a security measure. The data objects may include source code, modules, object definitions, methods, functions, or resource configuration that, as a result of being compiled, may be useable by a computer system to implement a security measure. The development environment 220 may correspond to a development stage of an integrated workflow process for producing software. The integrated workflow process may include a plurality of sequential stages in which software is developed, built, tested, and made available for use. After the security configuration 218 is developed using the development environment 220, an authorized entity (e.g., developer, programmer) may submit the security configuration 218 for analysis and/or authorization.

The production authorization service 216 may receive the security configuration 218 and generate information regarding deployment of the security configuration 218. The production authorization service 216 may be a computer system comprised of software and hardware (e.g., servers, personal computers) including one or more processors and memory that stores executable instructions whose execution by the one or more processors causes the authorization service 216 to perform the operations described herein. The information generated by the authorization service 216 may include an authorization decision 224 indicating whether the security configuration 218 is approved or should be approved for production by a production environment 222, and/or guidance regarding one or more aspects of the security measure. The authorization decision and/or guidance may be determined based at least in part on the telemetry metrics 210 provided from the telemetry service 206 and the security configuration 218 received. For example, the authorization service 216 may apply the set of assessments 214 generated as a result of the telemetry metrics 210 to the security configuration 218 to determine whether the security measure is or should be approved for implementation. As another example, the authorization service 216 may generate guidance proposing one or more actions to be taken based on application of the set of assessments 214 to the security configuration 218.

The guidance provided based on the set of assessments may include conditions under which a proposed security configuration should or should not proceed to production (e.g., be made available for access by an end user), or specify conditions that should be met for the proposed security configuration to proceed to production. In one embodiment, as a result of the authorization service 216 determining that the security configuration 218 should not be authorized, the authorization service may provide a notification to one or more authorized entities, such as a programmer, developer, or administrator, that approval of the security configuration 218 was denied. Moreover, the notification may include information indicating why the approval was denied, such as by indicating conditions or criteria that the security configuration 218 failed to satisfy. The notification may further indicate a set of modifications that, if implemented in the security configuration 218, could improve the likelihood that the authorization service 216 would approve the security configuration 218 for production. The authorization service 216 may provide the notification to the development environment 220 or to a notification service 226 configured to distribute the notification to the appropriate parties, such as the customer, system administrator, developers, and/or programmers.

The production environment 222, in response to receiving the authorization decision 224, may determine whether to deploy the security configuration 218 into production. The production environment 222 is a service that hosts resources, including security measures, and offers the resources to other services, applications, users, or end points of the service provider. In response to receiving an authorization decision 224 indicating approval of the security configuration 218, the production environment 222 may make the security configuration 218 available for use by service provider entities, such as by deploying or releasing the security configuration 218 into production. The production environment 222 may obtain the security configuration 218 to be made available in association with the authorization decision 224 indicating approval of the security configuration 218, such as by receiving the security configuration 218 from the authorization service 216, the development environment 220, or data storage storing the security configuration 218. The production environment 222 may, in response to receiving an authorization decision 224 indicating disapproval of the security configuration 218, the production environment 222 may not make the security configuration 218 available to other service provider entities, such as by preventing the security configuration 218 from being built or maintaining the security configuration 218 in data storage inaccessible to the other service provider entities. The production environment 222 may be a computer system comprised of software and hardware including one or more processors and memory that stores executable instructions whose execution by the one or more processors causes the production environment 222 to perform operations described herein. For instance, the production environment 222 may be a collection of computing devices (e.g., production servers, personal computers) that authorized users (e.g., system administrators) may operate to deploy resources (e.g., software, configurations, applications) to end users.

In association with an authorization decision 224 indicating approval of the security measure, a build process may be performed to generate a usable version of the security configuration 218 using resources provided by the development environment 220, such as source code. The build process may include encoding human-readable format resources and configurations (e.g., source code, JSON) into machine-readable format resources and configurations (e.g., object code, executable code). The build process may be performed by any suitable computing entity, such as a compiler that is able to generate machine readable executable code from source code provided by developers and/or programmers. A build, in an embodiment, is hardware, software, or a combination thereof, that includes instructions to perform a build process which includes compiling, interpreting, assembling, etc., a software package or a portion thereof. In an embodiment, an application definition document is a generic document model generated from a pipeline template package (e.g., a LPT package) describing the entire service resource configuration in a human-readable format such as JavaScript Object Notation (JSON), Extensible Markup Language (XML), or, more generally, any structured markup language—this template may be generated during build time, and may be used as an intermediate format to call downstream services to configure resources. In an embodiment, an application definition is encoded in a machine readable interchange format that describes how to provision and deploy stages of a pipeline—for example, to a beta stage, then to a pre-production stage, then to a first production region, then to one or more additional production regions, and so on. The build process may be initiated and/or performed by the production environment 222 in response to receiving approval from the authorization service 216, or may be initiated and/or performed by another service of the service provider. For example, the production environment 222 may cause the security configuration to be deployed for production.

Figure 3:
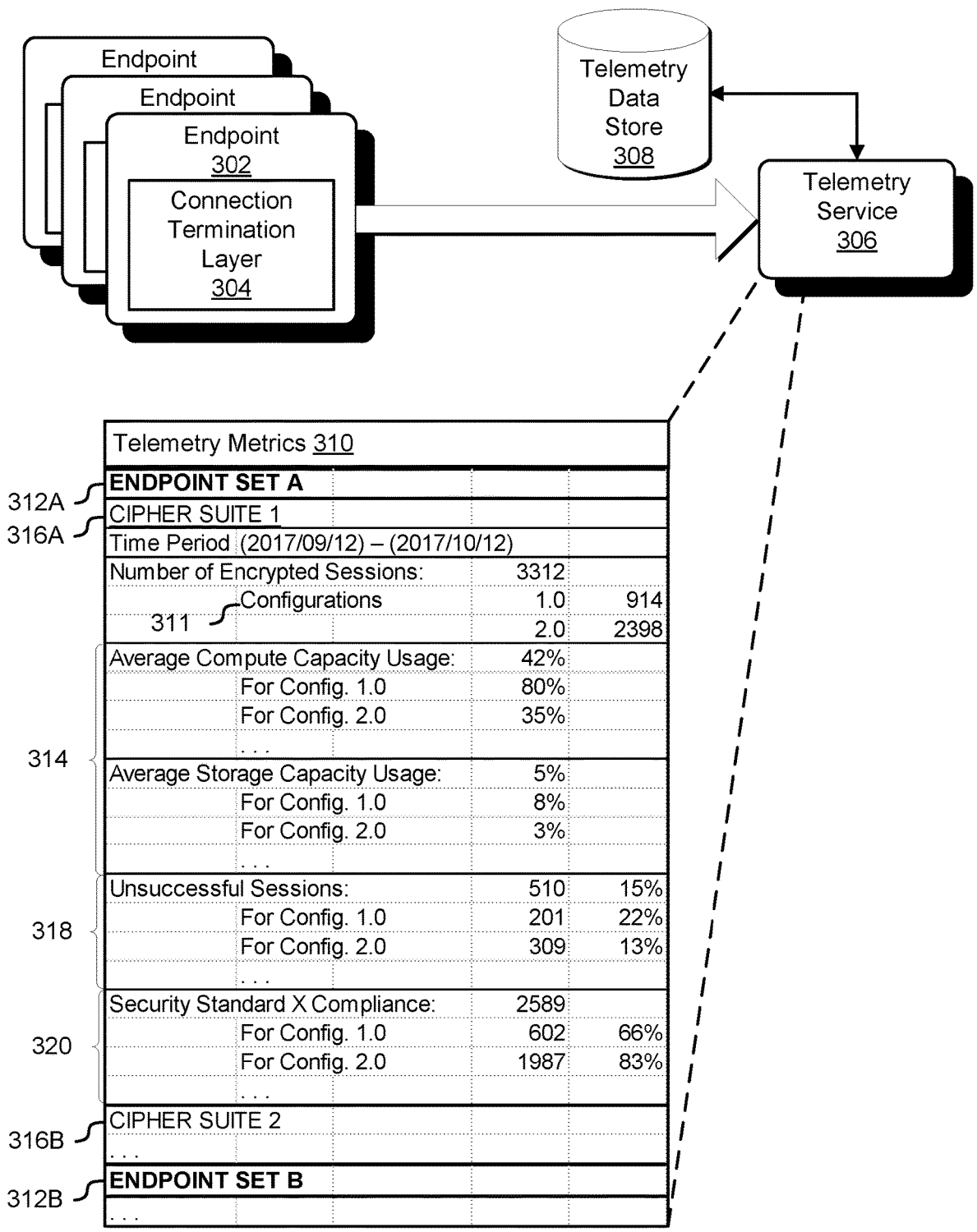
FIG. 3 illustrates an environment for collecting telemetry data.

FIG. 3 shows a diagram 300 illustrating the collection and provisioning of telemetry data according to one or more embodiments discussed herein. One or more security measures are used in connection with communications between a set of endpoints 302 and entities separate from the endpoints 302. The endpoints 302 may be resources of the computing resource services provider, such as the applications or services described above. The separate entities may be users or other resources of the service provider that are accessing or attempting to access the endpoints 302 and/or the resources provided thereby. The security measures may be implemented by various systems of the service provider to provide enhanced data security. In one embodiment, the security measure may relate to establishing cryptographically protected communications sessions over which communications between the endpoints 302 and the separate entities may be transmitted. Examples of such cryptographically protected communications sessions are transport layer security (TLS) sessions. Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions.

Note that, while encrypted communications sessions are discussed throughout for the purpose of illustration, sessions that do not utilize encryption to provide message confidentiality are considered as being within the scope of the present disclosure. For example, modes of TLS that do not encrypt records, but that utilize cryptographic keys for message integrity can be used in place of encrypted communications sessions and the techniques discussed herein may be adapted accordingly. Such sessions, which despite not utilizing encryption for message confidentiality, nevertheless utilize cryptographic keys to cryptographically protect information (e.g., from tampering). Sessions that utilize cryptographic keys for message integrity and/or message confidentiality can be generally referred to as cryptographically protected communications sessions. In other words, cryptographically protected communications sessions include encrypted communications sessions and sessions that, while not providing message confidentiality, provide other ways of cryptographically protecting information (e.g., by providing message integrity). Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, and other protocols, such as protocols for secure communication that include a handshake.

Security measures other than cryptographically protected communications sessions are also considered as being within the scope of the present disclosure. For instance, a security measure may include utilizing one or more cryptographically algorithms to perform cryptographic operations, such as encrypting and/or decrypting data. Such cryptographic algorithms may include, for example, Advanced Encryption Standard (AES), Blowfish, Data Encryption Standard (DES), Triple DES, Serpent or Twofish, and depending on the specific implementation selected, may be either asymmetric or symmetric key systems. Generally, the security measure may involve a cryptography service that uses a cryptographic algorithm (e.g., encryption algorithm, decryption algorithm) or combination of algorithms that utilize data managed by the cryptography service or other services. Performance of the cryptographic algorithm may involve converting ciphertext to plain text or converting plain text to ciphertext using one or more cryptographic keys. The security measure may involve other aspects, such as secure storage of keys for performance of the cryptographic operations. Further examples of security measures include establishing and/or maintaining a domain trust environment in which a structured collection of information defines a set of members and parameters for securely exchanging data using cryptographic information (e.g., a domain trust), generating and/or verifying digital signatures using a cryptographic algorithm in connection with one or more cryptographic keys, and so forth. Those of ordinary skill in the art will appreciate that these examples are non-limiting illustrations of the myriad security measures to which the present disclosure may apply.

The endpoints 302 may include a connection termination layer 304 that converts network traffic received over a cryptographically protected communications session from an encrypted form into a decrypted form. In particular, the connection termination layer 304 (also referred to as termination layer) may decrypt encrypted data from the separate entities using one or more cryptographic keys associated with the process of establishing a cryptographically protected communications session. For instance, the termination layer 304 may include software and/or hardware (e.g., servers) that act as a proxy to decrypt the network traffic on behalf of the endpoint 302. The termination layer 304 may be a part of the endpoint 302 (e.g., part of a host) or may be a service or application separate from the endpoint 302, such as a component of a load balancer, or a front-end interface service interfaces with entities external to the service provider (e.g., customers).

A telemetry service 306 collects telemetry data regarding network traffic received by the service provider. The telemetry data may include information indicating whether a security measure was implemented in connection with network traffic. For network traffic that is associated with a security measure, the telemetry data may include details regarding the security measure implemented. For example, the telemetry data may indicate whether a communication was received over a cryptographically protected communications session, or whether a communication includes a request to establish a cryptographically protected communications session. The telemetry data may include details regarding the protected communications session, such as a protocol used to establish the session (e.g., TLS protocol, SSL protocol), parameters used to establish the session (e.g., information exchanged during a handshake process), and/or a cipher suite used in connection with the communications session. The cipher suite may include information regarding various aspects of a protocol, including message authentication code (MAC) information, a key exchange information, encryption information, authentication information, and/or information identifying functions used in association with the protocol. For example, the telemetry data may indicate protocol versions (e.g., TLS version 1.2), key exchange algorithms (e.g., Rivest-Shamir-Adleman ("RSA") algorithm, Diffie-Hellman algorithm), authentication algorithms (e.g., Digital Signature Algorithm ("DSA"), Elliptic Curve Digital Signature Algorithm ("ECDSA")), block ciphers (e.g., Advanced Encryption Standard ("AES"), Rivest Cipher 4 ("RC4")), and/or message authentication code protocols, such as hash function (e.g., MD5, SHA-1).

The telemetry data may also include other information that is useable to determine various metrics regarding the security measure. For instance, the telemetry data may include resource usage information regarding the security measure, such as an amount of processing power, memory, and network bandwidth required to implement the security measure. The telemetry data may include hardware and/or software configuration information of an endpoint 302 or termination layer 304. The resource usage information may be useful in determining that implementing a certain cipher suite in association with a hardware/software configuration may adversely affect the performance of an endpoint 302—for instance, where implementing a certain cipher suite in association with a certain configuration may cause an endpoint 302 to become unresponsive or consume a large amount of available resources. The telemetry data may include other information, such as time information associated with a session (e.g., when the session was established, a time period for the session, how long the session was established), a session identifier, information regarding the separate entity, such as user information (e.g., account identification information), or information identifying a service or application. The telemetry data may further include extension information, such as an intended host for the connection, application layer protocol information, renegotiation information, and certificate transparency information, by way of non-limiting example. In one embodiment, the telemetry service 306 includes software for running an agent that, as a result of executing the software, acts as an intermediary or on behalf of the telemetry service 306 to obtain the telemetry data from the endpoints 302. In one embodiment, the endpoints 302 may include a software agent that collects and sends the telemetry data to the telemetry service 306.

The telemetry service 306 may collect the telemetry data received from the endpoints to determine information regarding the telemetry data with respect to one or more security measures. The telemetry service 306 may store the telemetry data received in a telemetry data store 308 and determine metrics regarding the security measures over time. The telemetry data store 308 may include data storage media capable of storing, accessing and retrieving the telemetry data, and may include any combination and number of data servers, databases, data storage devices and data storage media, in any standard, distributed, virtual or clustered environment. The telemetry service 306 may store the telemetry data in an indexed structure that facilitates the rapid retrieval of telemetry data according to one or more parameters, such as the time period associated with the telemetry data, security measure information, and/or hardware/software configuration.

The telemetry service 306 may perform an analysis to determine telemetry metrics 310 based on the telemetry data received. In one embodiment, the telemetry service 306 may analyze telemetry data received to determine metrics regarding security measures implemented. The telemetry service 306, for instance, may aggregate information received from the endpoints 302 regarding the security measures and use the aggregated information to determine statistical data regarding the security measures. The telemetry metrics 310 may be determined for individual ones of the security measures over a given period of time—for instance, a period of time beginning at a first date and time and ending at a second date and time. Moreover, the telemetry metrics 310 may be determined in real time such that telemetry data collected for current implementations of the security measures are analyzed and included in the telemetry metrics 310. This may enable the production authorization service and/or telemetry analytics service to generate assessments in real-time regarding current or recently deployed security measures. The telemetry metrics 310 may indicate metrics regarding implementing the security measures on various hardware and/or software configurations for computer systems of the endpoints 302, as described below. The telemetry service 306 may provide the telemetry metrics 310 to a telemetry analytics service, as described below with respect to FIG. 4.

The telemetry metrics 310 determined by the telemetry service 306 may include metrics regarding security measures implemented by or for sets of endpoints 312, which include exclusive or non-exclusive sets of the endpoints 302. The telemetry service 306 may determine metrics according to a specific security measure implemented. The telemetry metrics 310, for instance, may include metrics determined for a security configuration associated with security configuration 316A implemented by a first set of endpoints 312A. The security configuration 316A in the diagram 300 is indicated as corresponding to a particular cipher suite (i.e., cipher suite A), which may be implemented in connection with establishment of a cryptographically protected communications session, such as by defining a particular configuration for a communications protocol. The metrics determined may correspond to other security measures 316 or aspects thereof, such as communications protocols (e.g., TLS 1.0, TLS 1.1, TLS 1.2, TLS 1.3, SSL 1.0, SSL 2.0, SSL 3.0), authentication algorithm, key exchange algorithm, message authentication code algorithm, pseudorandom function, and/or encryption algorithm, by way of non-limiting example. The telemetry service 306 may use or involve statistical functions or metrics in association with generating the telemetry metrics 310, such as an average value, a mean value, or standard deviation associated with a particular metric.

The telemetry metrics 310 determined by the telemetry service 306 may include information regarding the safety and/or security associated with implementing a security measure. The telemetry metrics 310 may include resource utilization metrics 314 that are indicative of the resources used to implement the security measure. The resource utilization metrics may include metrics regarding one or more computing resources, such as metrics indicating an amount of computing capacity used to implement the security measure (e.g., CPU usage, percentage of available compute capacity), metrics indicating an amount of data storage used to implement the security measure (e.g., amount of memory used, percentage of available memory used), or metrics indicating an amount of network bandwidth used in association with the security measure.

The telemetry metrics 310 may include compliance metrics 320 indicating whether the security measure complies with one or more security standards. The compliance metrics 320 may indicate compliance of security measure with a particular security measure, such as a proprietary security standard, or a standard set by an industry group (e.g., Security Standards Council, Institute of Electrical or Electronics Engineers) or a government body (e.g., National Institute of Standards and Technology). The telemetry metrics 310 may further include metrics 318 indicating a measure of unsuccessful implementation of the security measure by the set of endpoints 312. Unsuccessful implementation may be determined based on whether a security measure was unable to be executed by a computer system endpoint—for example, that a configuration of the endpoint was unable to execute the security measure, the endpoint exceeded its allocated resources in association with execution of the security measure, and/or that the endpoint was unable to function properly due to execution of the security measure. The telemetry metrics 310 may include other metrics not depicted in the diagram 300, such as effectiveness metrics indicating effectiveness of implementation of a security measure (e.g., number of attacks prevented by the security measure), accessibility metrics indicating a measure of the ability of computer systems to access the set of endpoints in association with the security measure (e.g., number of instances a user accessed a service using the security measure, number of instances a user was prevented from accessing a service because of the security measure); and usability metrics indicating a measure of the extent to which the set of endpoints could be effectively used in association with the security measure (e.g., number of instances a user successfully used a service offered by an endpoint implementing the security measure, number of instances in which functionality of a service offered by an endpoint was affected because of the security measure), by way of non-limiting example.

The telemetry metrics 310 determined by the telemetry service 306 may be determined in association with one or more configurations for computer systems of the endpoints 312 implementing a security measure. The metrics may indicate usage of the security measure in a given time period—for example, the number of cryptographically protected communications sessions that used, or were established using, the security measure. The telemetry metrics 310 may be determined for one or more configurations 311 of the endpoints. The configurations may correspond to hardware configurations and/or software configurations of one or more computer systems of the endpoints. The hardware configuration corresponds to hardware with which the one or more computer systems are equipped or which are available to the computer systems, and may include various aspects of hardware, such as processor configurations (e.g., chipset, processor speed/power), data storage configuration (e.g., amount of available memory, type of memory), or network hardware configurations (e.g., network adapters, network bandwidth/speed). The software configuration corresponds to the software installed on the one or more computer systems, such as operating system, software versions, and/or drivers. The software configurations may also correspond to supported aspects of software and protocols, such as cryptographic protocols, cipher suites, compression methods, extensibility, application data protocols, encryption/decryption methods, and vulnerabilities, by way of non-limiting example. The metrics may be determined with regard to one or more of the configurations (e.g., security configuration, computer system configuration)—for instance, the telemetry metrics 310 indicate a lower compute capacity usage for one configuration of the endpoints 312—35% for "Config. 2.0"—than the compute capacity usage for another configuration—80% for "Config. 1.0". As another example, the telemetry metrics 310 indicate that one configuration for the endpoints 312 produces better security standard compliance results—83% for "Config 2.0"—than the security standard compliance results of another configuration—66% for "Config 1.0". These metrics may indicate that a certain configuration for the endpoints may exhibit more optimal characteristics in association with implementing a security measure than another configuration.

Figure 4:
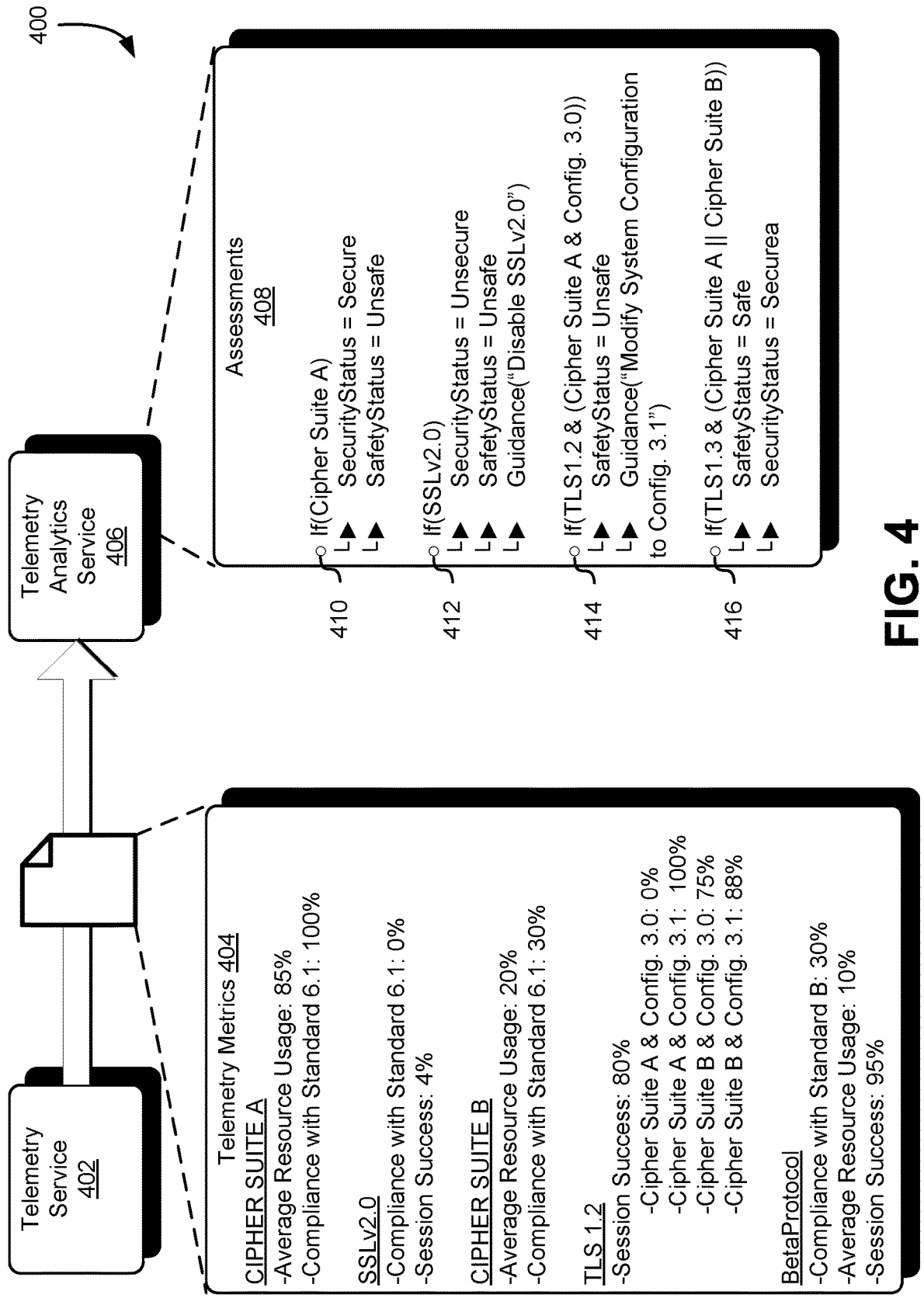
FIG. 4 illustrates an environment in which a set of assessments are provisioned to a production authorization service.

FIG. 4 shows a diagram 400 illustrating generation of a set of assessments based on the telemetry metrics according to one or more embodiments discussed herein. The telemetry service 402 may provide the telemetry metrics 404 generated to a telemetry analytics service 406, which may use the telemetry metrics 404 to provide guidance regarding evaluation of a proposed security configuration. In particular, the telemetry analytics service 406 may perform an analysis on the telemetry metrics 404 to generate a set of assessments 408 that are useable to evaluate a security measure that is proposed for implementation with one or more computer system endpoints. The analytics service 406 may process the telemetry metrics 404 and detect conditions of the telemetry metrics 404 that should be included in a security measure or, conversely, detect conditions of the telemetry metrics 404 that should be excluded from a security measure. The analytics service 406 may generate the set of assessments 408 based on the conditions detected.

To generate the set of assessments, the analytics service 406 may identify one or more metrics in the telemetry metrics 404 associated with a security measure aspect that positively or negatively impact operation of an endpoint or customer experience. The analytics service 406 may determine that a particular metric identified is correlated to a particular security measure configuration aspect. For instance, the analytics service 406 may identify a metric that indicates implementing the security measure configuration aspect causes an excessive amount of computing resources to be consumed, adversely affects user experience, or creates a security risk or vulnerability. Based on correlating the metric with a particular security measure configuration aspect, the analytics service 406 may generate a set of logical conditions relating to the metric that are associated with a status and/or guidance for a proposed security configuration detected as including or being associated with the security measure configuration aspect. The set of assessments 408 generated may specify a set of logical conditions that, as a result of being detected in a proposed security configuration, result in provisioning of a status information and/or guidance information.

As a first example, the analytics service 406 may identify that implementing a security measure that includes a certain configuration (e.g., collection of cryptographic algorithms) identified as "Cipher Suite A" causes 85% of an endpoint's computing resources to be used. Accordingly, the analytics service 406 may generate a rule 410 specifying that a operability status associated with the security measure should be indicated as being "Unsafe" in response to identifying that a proposed security configuration uses "Cipher Suite A". The analytics service 406 may identify that a security measure with the "Cipher Suite A" configuration has 100% compliance with a certain security standard, "Standard 6.1". The analytics service 406 may therefore specify, in the rule 410, that a security status should be indicated as being "Secure" in response to detecting that a security measure has a "Cipher Suite A" configuration. As a second example, the analytics service 406 may identify that implementing a security measure including an "SSLv2.0" configuration (i.e., supporting SSL version 2.0) may result in a 4% success rate in establishing cryptographically secure communications sessions with an endpoint, and may have a 0% compliance rate with a security standard "Standard 6.1". Accordingly, the analytics service 406 may generate a rule 412 specifying that, in response to detecting a security measure that includes an "SSLv2.0" configuration, (i) a operability status associated with the security measure should be indicated as being "Unsafe;" and (ii) that security associated with the security measure should be indicated as being "Unsecure."

The determination of whether a particular metric is favorable or unfavorable may be based on a predetermined range stored in data storage accessible by the analytics service 406. The predetermined range may correspond to a numeric range for an aspect of the telemetry metrics that is associated with a positive or negative effect—for example, that a metrics associated with a particular aspect is between a first number and a second number. An example of the predetermined range may be a predetermined threshold corresponding to a numeric value for an aspect of the telemetry metrics. The predetermined threshold or range may be set by an entity having appropriate authority, such as a developer, programmer, or system administrator. The numerical value for the metric relative to the predetermined range (e.g., within the predetermined numeric range, greater than the threshold, less than the threshold) may determine whether a security feature in a security configuration produces a favorable or unfavorable result. For example, a metric for computer resource usage exceeding a particular usage range (e.g., range between 0% and 50% of available computing resources) may be indicative of a security configuration that is unfavorable because it causes excessive computing resource usage.

The analytics service 406 may determine other conditions associated with a security measure aspect that positively or adversely affect operation of a system or user experience associated with implementing the security measure. The analytics service 406 may determine security measure aspects that, as a result of being implemented in association with a set of conditions produce optimal or suboptimal results. For instance, in analyzing the telemetry metrics 404, the analytics service 406 may identify that, in association with implementing a security measure "TLS 1.2", there are some combination of computer system configuration and security measure aspects that are optimal and some that produce suboptimal performance results. In particular the analytics service 406 may identify that implementing a particular security measure aspect, "Cipher Suite A", in combination with a particular computer system configuration, "Config. 3.0", has a low success rate for establishing a communications session—"0%" in this instance. The analytics service 406 may generate a rule 414 recommending modification of the computer system configuration to "Config. 3.1" rather than "Config. 3.0". One or more rules 416 may be generated indicating that a condition associated with a security measure is both safe and secure to implement.

The set of assessments 408 may be a set of executable instructions that, if executed by a processor of a computer system such as the security measure authorization service, cause the computer system to perform operations described herein. The executable instructions may be machine code or source code that is compiled at or before runtime to generate machine code. The executable instructions may be generated using one or more appropriate programming languages, including JavaScript, HyperText Markup Language ("HTML"), Cascading Style Sheets ("CSS"), C++, or C#, by way of non-limiting example. In one embodiment, the set of assessments 408 are automatically generated by the analytics service 406. In one embodiment, the set of assessments 408 may be generated by an authorized human user, such as a system administrator, developer, or programmer.

Figure 5:
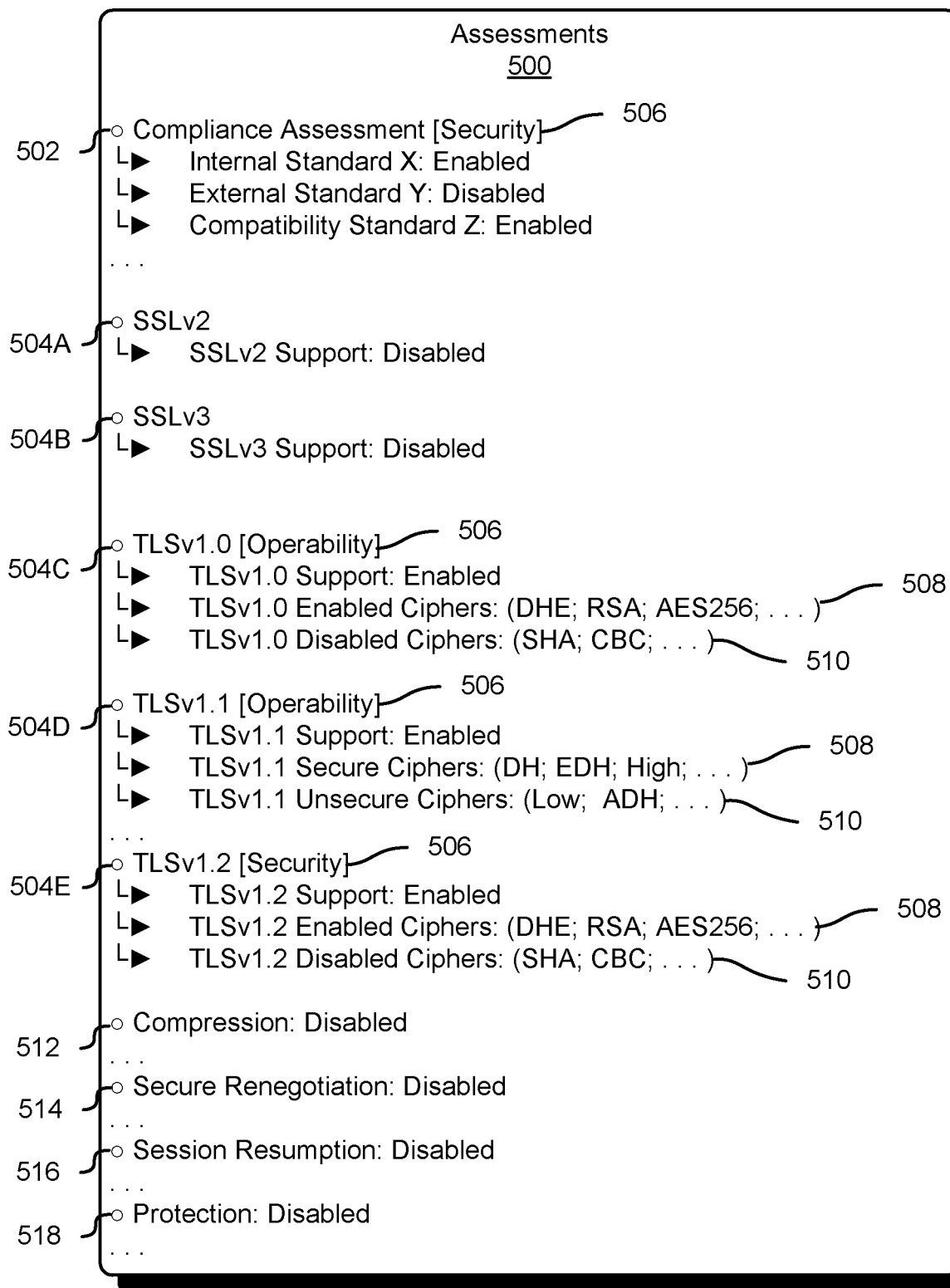
FIG. 5 illustrates a set of assessments according to one or more embodiments.

FIG. 5 shows a set of assessments 500 that include one or more assessments to perform in connection with evaluating a proposed security configuration. The set of assessments 500 correspond to an embodiment for the set of assessments generated by the analytics service described above. The set of assessments 500 are useable to determine whether the proposed security configuration should be authorized for implementation based on the results of the one or more assessments. The set of assessments 500 may include a compliance assessment 502 for determining whether a proposed security configuration complies with one or more standards for data protection, such as security standards, cryptography standards, technological standards, and so forth. The compliance assessment 502 may include assessments for compliance with internal standards, such as proprietary standards set by a corporate entity, and external standards, such as those set by government bodies and industry groups. The compliance assessment 502 may comprise an assessment of whether a particular security measure complies with a compatibility standard defining various policies for determining compatibility with hardware and/or software of a service provider. For example, the compatibility standard may define factors to be considered in determining whether a proposed security configuration is compatible with a load balancer for distributing network traffic.

The one or more assessments may include protocol assessments 504 for determining whether support for various security algorithms, ciphers, and protocols, and aspects or configurations thereof, are included in or excluded from the proposed security configuration. Examples of protocol assessments 504 include an assessments related to evaluating support for SSL protocols, TLS protocols, Kerberos protocols, and internet key exchange protocols ("IKE"). The protocol assessments 504 may comprise assessments related to evaluating support for various ciphers and algorithms, including AES, RSA, SHA, Diffie-Hellman, and Elliptic Curve cryptography algorithms, by way of non-limiting example. The protocol assessments 504 may include settings for evaluating whether an endpoint computer system has the hardware and/or software to support a protocol.

As one example, a protocol assessment may evaluate a proposed security configuration with respect to support for a particular cryptographic protocol, and may include various subassessments. A SSLv2 protocol assessment 504A, for instance, evaluates whether the proposed security configuration, including the hardware and/or software thereof, is configured to support cryptographically protected communications sessions using SSL version 2.0. An indication of SSLv2 enablement may be associated with the SSLv2 protocol assessment 504A. For example, if the SSLv2 support evaluation is "Enabled", the build authorization service will determine that the proposed security configuration passes the evaluation if the proposed security configuration includes SSL version 2.0 support, and determine that the proposed security configuration fails if the proposed security configuration excludes SSL version 2.0 support. If, on the other hand the SSLv2 support evaluation is "Disabled", as shown, the build authorization service will determine that a proposed security configuration fails if the proposed security configuration includes SSL version 2.0 support, and determine that the proposed security configuration passes if the proposed security configuration excludes SSL version 2.0 support. Other protocol assessments may be included in the set of assessments 500, including an SSLv3 protocol assessment 504B for evaluating the proposed security configuration for SSL version 3.0 support, a TLSv1.0 protocol assessment 504C for evaluating the proposed security configuration for TLS version 1.0 support, a TLSv1.1 protocol assessment 504D for evaluating the proposed security configuration for TLS version 1.1 support, a TLSv1.2 protocol assessment 504E for evaluating the proposed security configuration for TLS version 1.2 support.

Each of the protocol assessments 504 may include subassessments corresponding to those described above with respect to the subassessments of the protocol assessment 504A—for example, an indication of whether support for a particular protocol should be enabled or disabled in a proposed security configuration, sets of enabled ciphers and/or protocols, and sets of disabled ciphers and/or protocols. Other evaluations may be included in each protocol assessment 504A, such as ciphers and algorithms associated with a protocol that should or should not be supported. For example, an enabled ciphers evaluation 508 identifies a set of ciphers that the proposed security configuration should be enabled to support. The enabled ciphers evaluation 508 will pass if the proposed security configuration includes support for ciphers identified. In the assessments 500, the enabled ciphers support evaluations include a set of high security ciphers (i.e., "High"), RSA-enabled support, Diffie-Hellman-enabled support, and AES 256-bit enabled support, by way of non-limiting example. The authorization service will determine that the proposed security configuration fails if the proposed bill does not include support for the enabled ciphers indicated in the enabled ciphers evaluation 508. Individual ones of the protocol assessments 504 may also include a disabled ciphers evaluation 510 that identifies a set of ciphers that the proposed security configuration should not support (i.e., ciphers for which support should be disabled). The authorization service will determine that the proposed security configuration passes if the set of ciphers identified in the disable ciphers evaluation 510 are disabled. On the other hand, the authorization service will determine that the proposed security configuration fails otherwise (i.e., if one or more of the set of ciphers identified in the disable ciphers evaluation 510 are enabled).

Other assessments in the set of assessments 500 may include, but are not limited to, the following: a compression assessment 512 for evaluating whether compression support should be enabled, and sets of compression methods and/or protocols that should be enabled or disabled in the support (e.g., deflate compression); a secure renegotiation assessment 514 for evaluating the proposed security configuration for compliance with a specified configuration for renegotiating a cryptographically protected communications session; a session resumption assessment 516 for evaluating the proposed security configuration for compliance with a specified configuration for resuming a previously established protected communications session; and a protection assessment 518 for evaluating the proposed security configuration for protection against various attacks (e.g., padding attacks, heartbleed; OpenSSL CCS injection).

A status significance 506 may be associated with one or more of the assessments. The status significance 506 may indicate, in evaluating the proposed security configuration, whether the associated assessment is related to determining a operability status, a security status, or both. In particular, the result of evaluation of the one or more assessments is assigned to a security status, an operability status, or both based on the status significance 506 indicated. If, for instance, the build authorization service determines that a proposed security configuration fails the compliance assessment 502, a failure designation may be assigned to the security status for the proposed security configuration. The default security status may be passing such that the status for a particular category (e.g., security, operability) is passing unless the proposed security configuration fails an assessment associated with a status significance 506. Different status significance 506 may apply to different assessments. Support for a particular protocol may affect the security status of a proposed security configuration whereas enablement/disablement of a particular set of cipher suites may affect the operability status of the proposed security configuration. Although security status and operability status are the categories indicated in the status significance for the set of assessments 500, other categories may apply.

Figure 6:
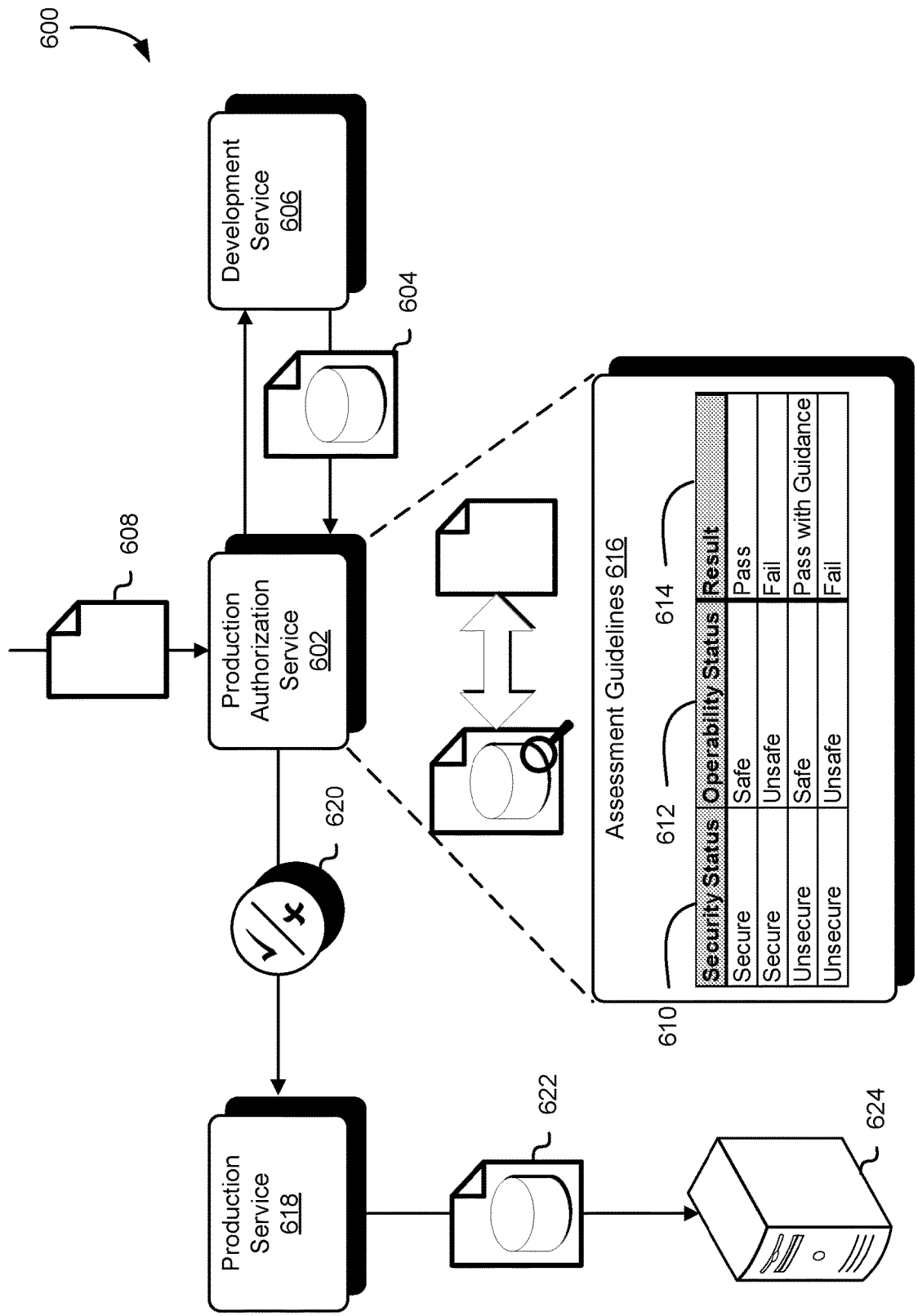
FIG. 6 illustrates an environment in which an authorization recommendation is provided.

FIG. 6 shows an environment 600 in which an authorization decision is determined for a proposed security configuration according to a set of assessments. A production authorization service 602 receives a proposed security configuration 604 from a development service 606. The proposed security configuration 604 may include a request to implement a build configuration for a set of software to be deployed on a computer system. The proposed security configuration 604 may include software for implementing a security measure for protecting data associated with the computer system—for instance, software for implementing a cryptographically protected communications session as described herein. The computer system may include a set of computer system endpoints (e.g., servers, virtual machines) for implementing a service of a computing resource service provider, such as a data storage service, and may include intermediate computer system components such as load balancers or proxies. The proposed security configuration 604 may include information regarding the computer system on which a production version of the proposed security configuration 604 is to be implemented, such as information identifying a set of hosts or endpoints of the computer system, hardware configuration information of the computer system (e.g., chipset information, network adapter information, data storage information), software configuration information of the computer system (e.g., software versions, drivers, support for ciphers and protocols), and network information (e.g., port numbers of the computer system, network address information, host address information).

The authorization service 602 may evaluate the proposed security configuration 604 based on a set of assessments 608 received from the telemetry analytics service described above. Specifically, the authorization service 602 may determine a operability status 612 and a security status 610 of the proposed security configuration 604 based on whether the proposed security configuration 604 satisfies conditions specified in the set of assessments 608. Evaluating the proposed security configuration 604 may include applying the set of assessments 608 to software and/or hardware configuration information associated with a set of target computer systems on which the proposed security configuration 604 is to be implemented.

As a result of performance of the set of assessments 608 on the proposed security configuration 604, the production authorization service 602 may determine that a security status 610 for the proposed security configuration 604 is "safe" or "unsafe", and that a operability status 612 for the proposed security configuration 604 is "secure" or "unsecure." The security status 610 of "secure" may indicate that the proposed security configuration 604 does not fail one or more security assessments of the strength of security measures included in the proposed security configuration. Assessment of the security measures may be based on whether the proposed security configuration satisfies one or more security criteria specified, for example, in an internal or external standard. The security status 610 of "unsecure" may indicate that the proposed security configuration 604 fails one or more security assessments included in the set of assessments. The operability status 612 of "safe" may indicate that, from a customer accessibility standpoint, or a target computer system operability standpoint, implementation of the proposed security configuration 604 may result in a configuration that is safe—that is, a configuration that a large portion of customers can access and that the will be stable and efficient for the target system to run. On the other hand, the operability status 612 of "unsafe" may indicate that a configuration may a significant amount of customers may not be able to access or that a target system may not be equipped to run or that may consume an excessive amount of computing resources to run.

Based on the conditions determined for the operability status 612 and the security status 610, the production authorization service 602 may determine whether to authorize the proposed security configuration 604 to be made available to computer system endpoints. Authorization of the proposed security configuration 604 may be based on a set of assessment guidelines 616 that specify a set of authorization results 614 each corresponding to a combination of operability status 612 and security status 610. The assessment guidelines 616 indicate that if the security status 610 is "secure" and the operability status 612 is "safe", the proposed security configuration 604 passes the set of assessments 608 and should be authorized for production by a production service 618, authorization service 602. The assessment guidelines 616 may also indicate that if the operability status 612 is "unsafe", then the proposed security configuration 604 fails the set of assessments 608 and should not be authorized for production by the production service 618. In connection with a determination that the proposed security configuration 604 fails, the authorization service 602 may provide an indication of the aspects of the proposed security configuration 604 that caused the failure, such as an indication of required protocols or ciphers that were not supported by the proposed security configuration 604. If the security status 610 is "unsecure" and the operability status 612 is "safe", then the proposed security configuration 604 may pass the set of assessments 608; however, the authorization service 602 may provide guidance to an authorized entity under this combination of conditions regarding modifications that can be made to the proposed security configuration 604 to improve security. The guidance may be provided to the development service 606, the production service 618, and/or one or more authorized entities associated with the proposed security configuration 604.

The authorization service 602 may provide an authorization decision 620 to the production service 618 according to the status combination. In response to receiving a decision 620 authorizing production of the proposed security configuration 604, the production service 618 may perform a process for finalizing and making a production version 622 of the security configuration 604 available to the appropriate computer system endpoints 624. Finalizing the production version 622 may include, for instance, compiling source code associated with the proposed security configuration 604 to produce a production version 622, causing the security configuration to be integrated with one or more systems of the endpoint 624, or storing the build in data storage accessible to the appropriate computer system endpoint 624. In response to receiving a decision 620 denying production of the build, the production service 618 may notify an authorized entity of the decision, or do nothing to finalize the build.

Figure 7:
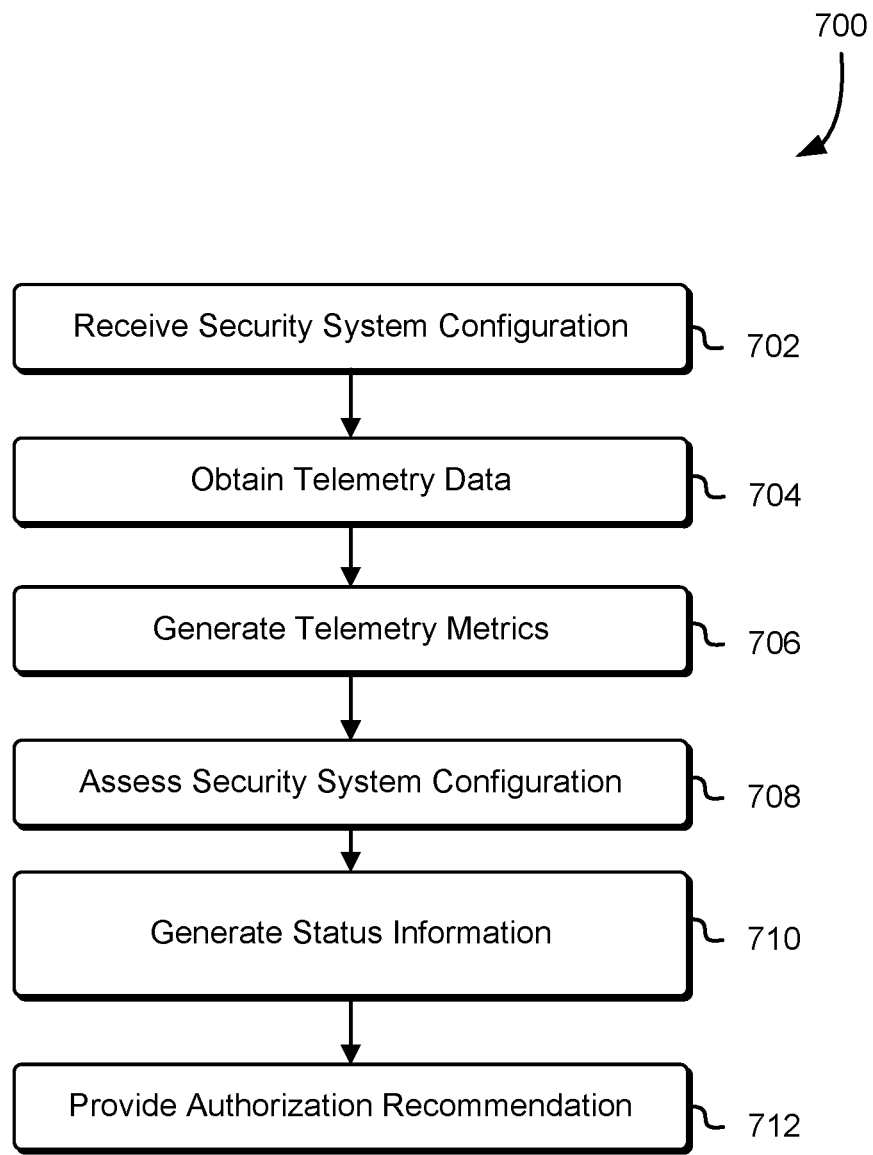
FIG. 7 illustrates a process for providing the authorization recommendation.

FIG. 7 shows a process 700 for determining whether to authorize production of a security configuration to a computer system according to one or more embodiments described herein. The process 700 may be performed by any appropriate service provider entity described herein, such as the telemetry analytics service and production authorization service. A security configuration may be received 702 from a development environment, as described above with respect to FIGS. 1, 2, and 6. As described above, the security configuration may be part of a computer system configuration proposed for production. The security configuration may include information identifying a set of target computer systems on which the proposed security configuration is to be implemented, and may include information associated with the set of target computer systems (e.g., associated port numbers, network address information, configuration information of the set of target computer systems). The process 700 proceeds by obtaining 704 telemetry data regarding security configurations implemented on one or more computer systems, as described above with respect to FIGS. 1, 2, and 3. At least some of the telemetry data obtained 704 may be in response to receiving the security configuration so that assessment of the security configuration, as described below, is based on real-time analysis involving recent telemetry data. Telemetry metrics are then generated 706 using the telemetry data obtained, as described above with respect to FIGS. 1, 2, 3, and 4.

The security configuration is then assessed 708 based on the telemetry metrics, as described above with respect to FIGS. 1, 2, 5, and 6. For instance, a telemetry analytics service may determine that one or more security features adversely or positively affected operability or security of the computer systems, and generate a set of assessments to detect those security features in a proposed security configuration. The one or more security features may be determined in association with a configuration of the computer system implementing the security feature—for example, where a hardware/software configuration of the computer system was insufficient to support a particular security feature. Status information may be generated 710 based on a result of the assessment of the security configuration, as described above with respect to FIGS. 2, 5, and 6. The status information may include operability status information indicating whether the security configuration satisfies one or more conditions for operability, and may include security status information indicating whether the security configuration satisfies one or more conditions for security. The production authorization service may, based on the status information, provide 712 an authorization recommendation to a production environment indicating whether the security configuration should proceed to production on the target computer system, as described above with respect to FIGS. 1, 2, and 6. The authorization recommendation may include guidance regarding modifications to the security configuration or the target system configuration to improve deficiencies in operability or security associated with implementing the security configuration on the target computer system. Although the process 700 is described and depicted as being performed in a particular order, those of ordinary skill in the art will appreciate that the order of the steps may be changed without departing from the scope of the current disclosure. For example, the security configuration may be received after the telemetry data is obtained or after the telemetry metrics are generated.

Figure 8:
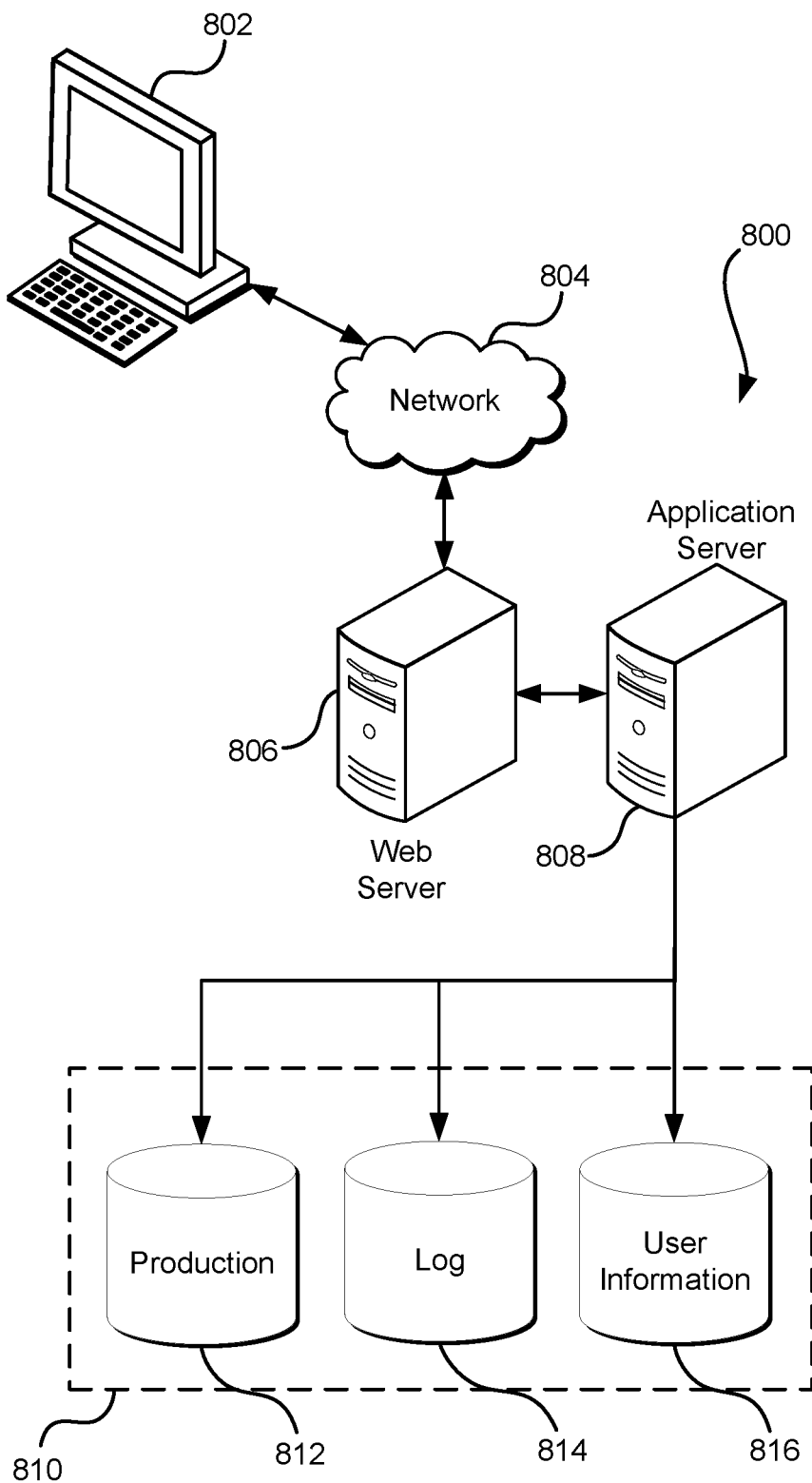
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment.

The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of Hyper-Text Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining telemetry metrics regarding one or more cryptographically protected communications sessions established with one or more computer system endpoints;
   receiving, from a development environment, security configuration information regarding security configuration proposed for deployment on a set of target computer systems to establish cryptographically protected communications sessions, the security configuration information identifying one or more cipher suites included in the security configuration;
   generating a set of assessments for assessing security and operability associated with implementing the security configuration, the set of assessments determined based at least in part on the telemetry metrics;
   performing the set of assessments on the security configuration;
   generating, based on a result of performing the set of assessments, operability status information indicating whether the security configuration satisfies one or more conditions for system operability, and security status information indicating whether the security configuration satisfies one or more conditions for system security; and
   providing, based on the security status information and the operability status information, an authorization recommendation regarding whether to authorize the security configuration for implementation on the set of target computer systems.

2. The computer-implemented method of claim 1, wherein the set of assessments includes an assessment regarding inclusion of support for one or more cryptographic protocols for establishing a cryptographically protected communications session.

3. The computer-implemented method of claim 1, wherein the set of assessments includes an assessment regarding inclusion of support for one or more cipher suites useable to establish a cryptographically protected communications session.

4. The computer-implemented method of claim 1, wherein the authorization recommendation is to approve production of the security configuration based on a determination that the security status information indicates that the security configuration fails to satisfy at least one of the conditions for system security and that the operability status information indicates that the security configuration satisfies the one or more conditions for system operability.

5. A system, comprising:
   at least one computing device to implement one or more services, wherein the one or more services:

obtain telemetry metrics regarding one or more security configurations implemented on one or more computer systems of a computing resources service provider;

receive a security configuration proposed for deployment on a target computer system, the security configuration to establish cryptographically protected communications sessions, the security configuration further identifying one or more cipher suites included in the security configuration;

generate operability status information and security status information, the operability status information indicating whether the security configuration satisfies one or more conditions for system operability, the security status information indicating whether the security configuration satisfies one or more conditions for system security, by at least applying a set of assessments to the security configuration, one or more of the set of assessments being based on the telemetry metrics; and authorize deployment of the security configuration on the target computer system as a result of determining that the operability status information satisfies one or more conditions for operability.

6. The system of claim 5, wherein deployment of the security configuration is disallowed as a result of determining that the security status information indicates that the security configuration fails to satisfy one or more conditions for security.

7. The system of claim 6, wherein the one or more services further generate guidance information identifying modifications to the security configuration that would cause the security configuration to satisfy one or more conditions for security.

8. The system of claim 5, wherein the operability status information is based on a result of the set of assessments indicating that the security configuration would not cause the target computer system to exceed a predetermined computer resource usage level.

9. The system of claim 5, wherein the operability status information is based at least in part on a result of the set of assessments indicating that the security configuration does not correspond to a security system characteristic of the one or more conditions for system operability determined as impeding authorized customer access.

10. The system of claim 5, wherein the security configuration comprises a protocol for establishing a cryptographically protected communications session.

11. The system of claim 5, wherein the set of assessments include one or more assessments for determining whether the security configuration includes a security feature corresponding to a feature of the one or more computer systems that was identified as producing a telemetry metric failing to satisfy one or more conditions for operability.

12. A non-transitory computer-readable storage medium storing thereon executable instructions that, as a result of execution by one or more processors of a computer system, cause the computer system to at least:

receive a security configuration proposed for deployment on a target computer system, the security configuration to establish cryptographically protected communications sessions, the security configuration further identifying one or more cipher suites included in the security configuration;

obtain telemetry metrics regarding one or more security configurations implemented on one or more computer systems, the telemetry metrics characterizing an effect of implementing the one or more security configurations on the one or more computer systems;

perform an assessment of the security configuration for inclusion of a set of security features identified as affecting operability of the one or more computer systems based at least in part on evaluation of the telemetry metrics;

generate, based on a result of performing the assessment, operability status information indicating whether the security configuration satisfies one or more conditions for system operability, and security status information indicating whether the security configuration satisfies one or more conditions for system security; and provide an authorization recommendation regarding deployment of the security configuration on the target computer system as a result of the operability status information and the security status information.

13. The non-transitory computer-readable storage medium of claim 12, wherein the assessment includes evaluation of whether support for one or more of the set of security features is enabled in the security configuration, and the authorization recommendation is based on a determination that the support for the one or more of the set of security features is enabled.

14. The non-transitory computer-readable storage medium of claim 13, wherein at least one of the set of security features is enabled support for a set of cryptographic algorithms in association with enabled support for a cryptographic protocol.

15. The non-transitory computer-readable storage medium of claim 12, wherein the assessment includes evaluation of whether support for one or more of the set of security features is disabled, and authorizing deployment of the security configuration is based on a determination that the support for the one or more of the set of security features is disabled.

16. The non-transitory computer-readable storage medium of claim 15, wherein at least one of the set of security features is disabled support for a set of cryptographic algorithms in association with enabled support for a cryptographic protocol.

17. The non-transitory computer-readable storage medium of claim 12, wherein evaluation of the telemetry metrics includes identifying a telemetry metric that is outside of a predetermined range, and determining that the telemetry metric is associated with the set of security features of the one or more security configurations.

18. The non-transitory computer-readable storage medium of claim 17, wherein performing the assessment of the security configuration includes determining whether the security feature is detected in the security configuration.

19. The non-transitory computer-readable storage medium of claim 12, wherein guidance information is provided in association with the authorization recommendation, the guidance information identifying modifications to the security configuration or the target computer system.

* * * * *